United States Patent [19]

Thurston et al.

[11] Patent Number: 5,630,756

[45] Date of Patent: May 20, 1997

[54] HAND CONTROLLER FOR VIDEO GAMES

[76] Inventors: Keith E. Thurston, 142B Medhurst Drive, Nepean, Ontario, Canada, K2G 5K8; Kenneth G. Thurston, 2711 Pimlico Crescent, Gloucester, Ontario, Canada, K1T 2A7

[21] Appl. No.: 596,580

[22] Filed: Feb. 5, 1996

[51] Int. Cl.[6] ..................................... A63F 9/22
[52] U.S. Cl. ...................... 463/38; 273/148 B; 345/161
[58] Field of Search ........................... 273/148 B; 463/36, 463/37, 38; 345/156, 157, 161

[56] References Cited

U.S. PATENT DOCUMENTS

| | | |
|---|---|---|
| 4,590,339 | 5/1986 | Scott-Jackson et al. . |
| 4,748,441 | 5/1988 | Brzezinski . |
| 5,113,179 | 5/1992 | Scott-Jackson et al. . |
| 5,160,918 | 11/1992 | Saposnik et al. . |
| 5,168,221 | 12/1992 | Houston ........................... 345/161 X |
| 5,225,831 | 7/1993 | Osborn . |
| 5,228,356 | 7/1993 | Chuang ........................... 273/148 B X |
| 5,286,024 | 2/1994 | Winblad . |
| 5,329,276 | 7/1994 | Hirabayashi ..................... 345/161 X |
| 5,389,950 | 2/1995 | Bouton . |

FOREIGN PATENT DOCUMENTS

D. 744486  7/1994  Canada .

Primary Examiner—Raleigh W. Chiu
Attorney, Agent, or Firm—Jones, Tullar & Cooper, P.C.

[57] ABSTRACT

A hand controller for playing video games comprises a base suitable for resting on a level surface, a shaft mounted for universal pivoting movement in the base, and a handle mounted at the upper end of the shaft, the handle having a main hand grip portion with an upper surface in the form of a convex ridge having front and rear surfaces sloping forwardly and rearwardly from a crest, and with the top of the crest sloping downwards from an upper end of the handle at an angle of between 10° and 50° to the level surface. The handle also has a wrist supporting plate which projects from its rear surface, the supporting plate being positioned for supporting the wrist of a right hand when the palm and fingers of the hand are grasping the main body portion with the thumb near to its upper end. The slope of the handle is adjustable. The controller also has a rotary member positioned at the front of the hand grip portion for rotation by the thumb of a right hand. The sensitivity of the controller can be adjusted both by moving the position at which potentiometers are attached to the shaft, and by altering the values of variable resistors in the potentiometer circuits.

19 Claims, 6 Drawing Sheets

HAND CONTROLLER FOR VIDEO GAMES

BACKGROUND OF THE INVENTION

1. Field of the Invention

The present invention relates to a hand controller or so-called "joy stick" for video games, especially flight simulation games.

2. Prior Art

Controllers for flight simulation games have to meet various requirements which are absent in simple video games.

Firstly, such controllers need to provide proportional control, i.e. to provide an output current from the controller to the computer which is at least roughly proportional to the displacement of the controller handle from a neutral position; this contrasts with on-off type control which can be used in simple games. Joysticks providing proportional control are discussed, for example, in the following U.S. Pat. Nos.:

4,590,339, issued May 20, 1986 to Scott-Jackson et al.

5,113,179, issued May 12, 1992, also to Scott-Jackson et al., 5,160,918, issued Nov. 3, 1992 to Saposnik et al., 5,225,931, issued Jul. 6, 1993 to Osborn, 5,286,024, issued Feb. 15, 1994 to Winblad, and 5,389,950, issued Feb. 14, 1995 to Bouton.

In a flight simulator game, the user needs to be able to sense the position of the handle by its feel, and relatively strong springs are required to give enough feel when small displacements are used. The use of strong springs in turn requires the use of a handle which is comfortable on the hand even when exerting strong pressure.

Furthermore, it is desirable that the sensitivity of the handle, e.g, the pressure and/or movement which needs to be used for full scale deflection, be variable. The above-listed patents of Scott-Jackson et al. show prior art methods for achieving this, which are, however, structurally complicated.

Also, while known forms of proportional control joysticks may be connected to provide aileron and elevator control, thus simulating an aircraft joystick, the video game may also involve rudder movements. Hitherto, rudder movements have been provided by a separate controller which simulates an aircraft rudder bar, i.e. is foot operated. However, it would be more convenient to have the rudder controlled by the same hand controller that controls other actions. Other buttons are also preferably included on a flight simulation controller, for example as mentioned in the above listed patent to Bouton.

SUMMARY OF THE INVENTION

In accordance with a first aspect of this invention, in a hand controller for playing video games, of the type comprising:

a base suitable for resting on a level surface;

a shaft mounted for universal pivoting movement in the base;

an electrical circuit having means responsive to the position of the shaft; and a handle mounted at the upper end of said shaft;

the handle has a main hand grip portion with an upper surface in the form of a convex ridge having front and rear surfaces sloping forwardly and rearwardly from a crest, and with the top of the crest sloping downwards from an upper end of the handle at an angle of between 10° and 50° to the surface on which the base part rests. Preferably, the angle is between 25° and 45°.

The handle preferably also has a wrist supporting plate which projects from its rear surface, the supporting plate being positioned for supporting the wrist of a right hand when the palm and fingers of the hand are grasping the main hand grip portion with the thumb near to said upper end.

The handle may be mounted to the shaft by means of a bracket having a cylindrically curved portion with an elongated slot, with the shaft passing through the slot and being held in the slot by releasable fastening means allowing adjustment of the position of the shaft in the slot, this adjustment being such as to change the angle of slope of the top of the crest. The handle may also be adjustable relative to the shaft by rotation about an axis which is parallel to the top of the crest, and by limited rotation about an axis normal to the top central region of the handle.

In accordance with another aspect of the invention, a hand controller may have a rotary member positioned at the front of the main hand grip portion for rotation by the thumb of a right hand having its palm and fingers grasping the main hand grip portion, the rotary member being connected to rotary position sensing means in the electrical circuit suitable for controlling one feature of the video game, such as the rudder in a flight simulator game. The rotary member is preferably positioned to be rotated by circular movement of the user's thumb.

A further rotary member may be provided, also positioned to be operated by the user's thumb, but in this case by a forward and backward motion of the thumb on a protruding periphery of the rotary member. For this purpose, the rotary member may be mounted on an axis which bisects the slopes of the front and rear surfaces of the handle.

In order to provide for variable sensitivity, in relation to the mechanical advantage of the shaft on springs tending to center the handle, the controller may include a sleeve mounted on the shaft between its lower end and the handle and connected to the base by extendible members which are orientated at right angles to each other when viewed along the shaft axis, each extendible member having spring means serving to bias the shaft into a central neutral position, and each including a linear potentiometer sensitive to compression and extension of the member and connected into said electrical circuit. Variable sensitivity is provided for by adjusting the position of the sleeve on the shaft.

As indicated above, in a flight simulation game, it is preferable for fairly strong springs to be used so that the user can sense the position of the handle by the pressure applied. Use of such strong springs may make it difficult to achieve full scale deflection, which is commonly required when calibrating a controller. To avoid problems with calibration, in accordance with another feature of this invention the potentiometers of the controller are connected in circuit with calibration switches and resistors and arranged to simulate the effect of movement of the potentiometers so that the operation of such switches gives a signal representative of full scale deflection of the handle in mutually perpendicular directions, without movement of said handle. The resistors may be variable, and the sensitivity of the potentiometers may be altered by adjusting these resistors.

BRIEF DESCRIPTION OF THE DRAWINGS

A preferred embodiment of the invention will now be described by way of example with reference to the accompanying drawings, in which.

DETAILED DESCRIPTION

Figure 1:
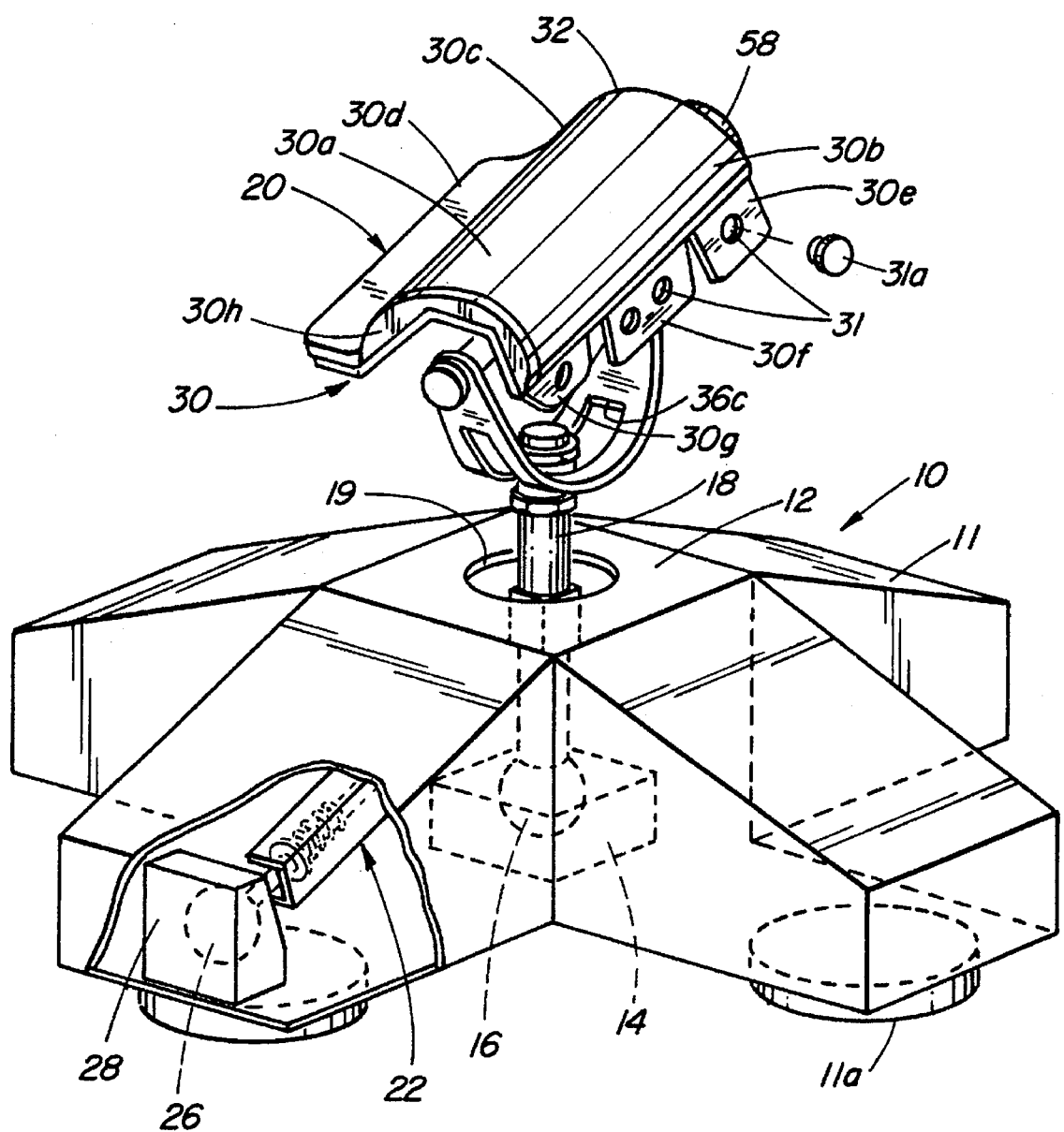
FIG. 1 is a perspective view of the controller of this invention, partially broken away.
Figure 2:
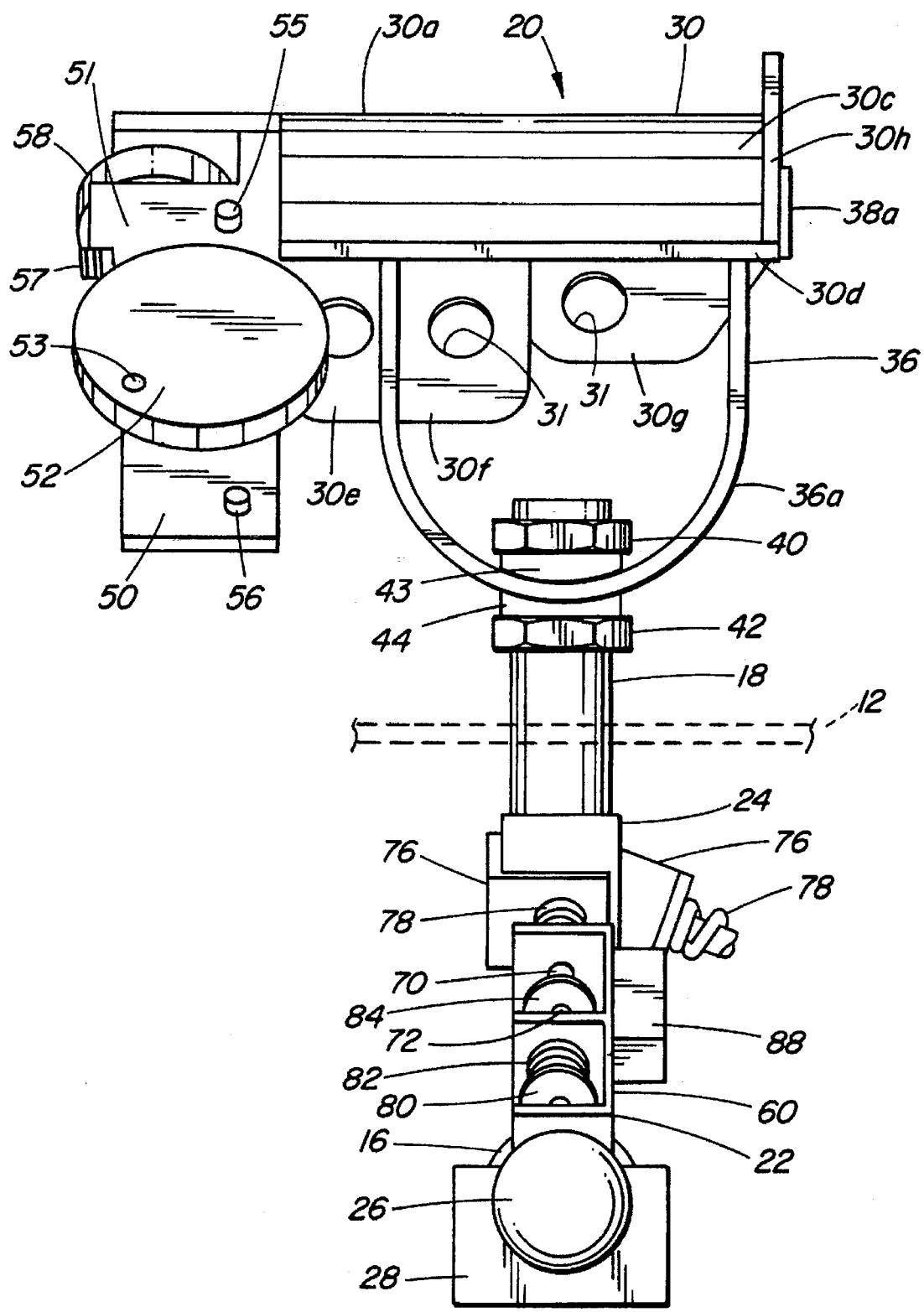
FIG. 2 is a rear elevational view of the main mechanical parts of the controller.

Referring firstly to FIGS. 1 and 2, the controller has a base 10 which is hollow and which has four legs 11 extending out from a square central hub 12, each leg having a foot 11a. In the bottom center of hub 12 is a bearing 14 which pivotally retains a ball 16 fixed to the lower end of generally vertical shaft 18. This shaft extends up through an aperture 19 in the top of the hollow hub 12, and at its upper end carries the handle indicated at 20.

The shaft 18 is biassed towards a generally vertical position by two extendible members 22, set at right angles when seen in plan view, and each having an inner, upper end connected to the shaft by sleeve 24 and an outer end provided with a ball 26 pivotal in a socket bearing block 28 near the extremity of a leg 11. The position of block 28 can be adjusted so that the shaft 18 can be made vertical when in its neutral position. Details of the extendible members, the sleeve 24, and associated potentiometers, will be given below.

The unique form of handle 20 used in this controller is shown in FIGS. 1 to 4. It comprises a bent metal plate 30 the main portion of which includes a central crest portion 30a, and downwardly sloping front and rear surface portions 30b and 30c. The handle as a whole, including the crest portion, also slopes away from an upper end adjacent the thumb of the user's right hand, which can be adjusted, as described below. A wrist supporting plate 30d extends rearwardly from the outer edge of surface 30c, this being parallel to the crest 30a and also meeting the portion 30c along a line which is parallel to the crest. The front edge of portion 30b has depending tab portions 30e, 30f, and 30g, which have apertures 31 for receiving buttons (such as button 31a indicated in FIG. 1) which can be pressed by the user's fingers. The plate also includes a flange 30h at that end of the handle which is normally lower, to locate the outer portion of the user's right hand. As seen in FIG. 1, the surfaces 30a, 30b, 30c and 30d are all overlaid with a resilient pad 32; this is omitted in FIGS. 2–4 for clarity. The combination of the shape of the plate 30, and the pad 32, provide a handle with a rounded or convex ridge; it being understood these terms include a handle shaped from a series of flat surfaces. The dimensions of the handle are such that the front and rear sloping surfaces may be moved by the palm and fingers of a hand which rest on rear and front sloping surfaces of the handle, while the wrist is supported by plate 30d also covered by pad 32. The handle may be made suitable for different sized hands by using different thickness of pad 32; usually this will be between ⅛ and ¼ inch in thickness; or may be several layers of thinner pads.

Figure 3:
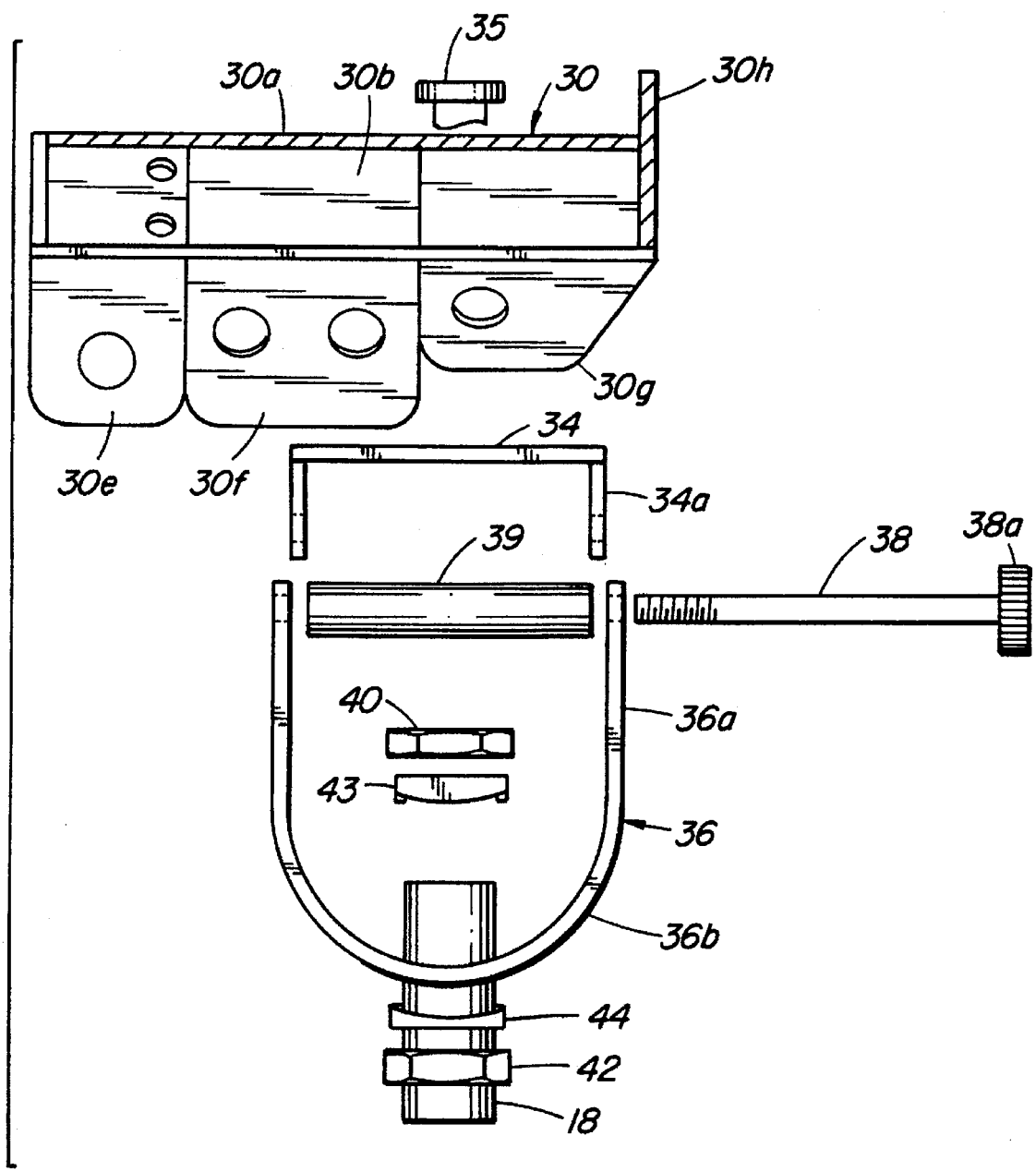
FIG. 3 is a view similar to FIG. 2, but showing only the handle and shaft parts of the controller, and showing these partially disassembled.
Figure 4:
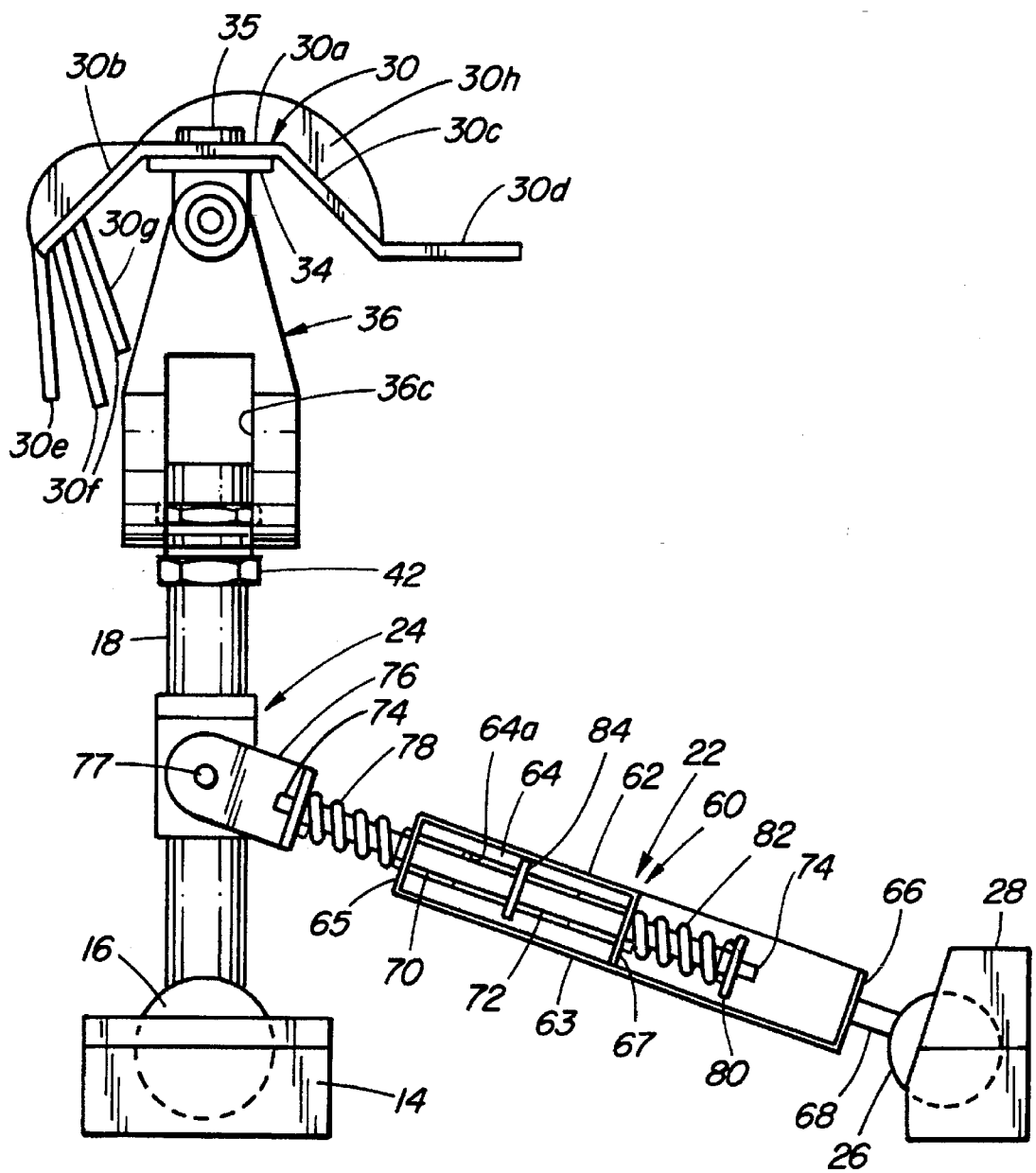
FIG. 4 is an elevation view of some components of the controller.

As shown in FIGS. 3 and 4, the plate 30 is fixed to an upper mounting bracket 34 by means of a screw 35; this allows for limited rotational adjustment of the handle about the axis of this screw, i.e about an axis normal to the top central region of the handle, of about 10°. This bracket 34 extends longitudinally of the crest portion 30a, and has two end flanges 34a which fit within the upper ends of a U-shaped lower mounting bracket 36, these brackets being connected by a locking bolt 38 which passes through matching apertures in the flanges 34a and in legs 36a of the lower bracket. The aperture in one leg 36a is threaded, and bolt 38 has a threaded outer end engaging in this aperture, and is also provided with a sleeve 39 occupying the space between the flanges 34a, and with a knurled knob 38a which can be tightened to hold the brackets together. This arrangement allows for adjustment of the orientation of the handle about an axis parallel to its crest.

The lower mounting bracket 36 has a cylindrically curved portion 36b centered on a horizontal axis perpendicular to the centerline of the crest, this portion being provided with an elongated slot 36c, as seen in FIGS. 1 and 4. This slot can receive the upper end of shaft 18 at any selected position along the slot, the shaft upper end being threaded for reception of upper and lower locking nuts 40 and 42. As indicated in FIG. 3, curved shims 43 and 44 are also provided which fit within the locking nuts against the curved upper and lower surfaces of the curved portion 36b, and allow this curved portion to be held firmly by tightening the nuts 40 and 42. The slot 36c is of sufficient length to allow adjustment of the angle of slope of the crest of the handle through about 45°. Normally, the handle will be adjusted so that the centerline of the crest of the handle lies at an angle between about 10° and 50° to a level surface on which the base is resting, with the end of the handle having flange 30h lowermost. It will thus be seen that the handle is adjustable both about an axis parallel to the centerline of the crest of the handle and about a horizontal axis perpendicular to this centerline.

Further unique features of the handle are the provision of rotatable elements or wheels, which can control different features of a video game.

Firstly, as best shown in FIG. 2, a plate 50 projecting rearwardly from the upper end portion of the handle, at a slope similar to that of the handle rear surface portion 30c, carries a rotatable element in the form of a wheel 52, rotatable about an axis preferably orientated approximately normal to the plane of the surface 30c, and set back slightly behind this plane. The position and orientation of this wheel are chosen so that the wheel can be rotated by rotary movement of the thumb of the right hand of a user with his hand on the handle as described. To make this easier, the wheel is provided with a small knob 53. In a flight simulation game, this wheel is connected to a potentiometer for controlling the rudder of the simulated aircraft, and allows the rudder to be controlled by the same hand which controls other game features. The plate 50 is part of a module 51 which also carries a throttle/pov (point of view) selector switch 55 and a rudder disable switch 56, respectively above and below the wheel 52, and pov switches 57 on an outer end surface of the module.

Secondly, a wheel or disc 58 is recessed into the upper end of the handle, this wheel having an axis perpendicular to the upper end of plate 30a forming the crest of the handle, and having a protruding part of its periphery accessible by the thumb of a user, so that it can be turned by forward and backward motion of the thumb. In a flight simulation game, this wheel 58 can be used for throttle control.

Figure 5:
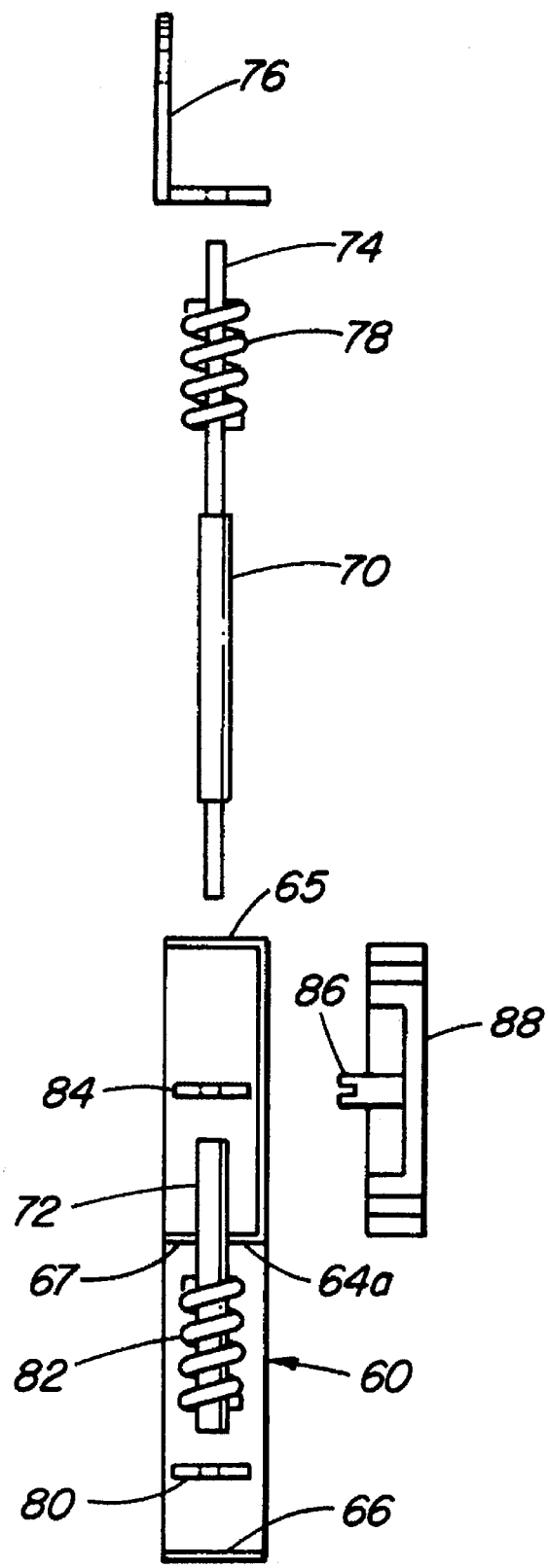
FIG. 5 is a view of an extendible member, disassembled.

The structure of the extendible members 22 will now be described with reference to FIGS. 4 and 5 showing one of the two identical members which are connected at right angles to the shaft 18 to give outputs corresponding to X and Y axes of movement of the handle. The main part of this element is an elongated housing 60 having similar top and bottom walls 62 and 63 and a rear wall 64 connected by inner and outer end walls 65 and 66, and by an intermediate wall 67. The outer end wall supports stem 68 which carries the ball 26 pivotal in housing 28. The inner end wall 65 and the intermediate wall 67 provide bearings which slidably receive, respectively, an inner cylindrical sleeve 70 and an outer cylindrical sleeve 72, which are both mounted on an elongated shaft 74. These parts are shown disassembled in FIG. 5. The inner end of shaft 74 is threaded into a pivot bracket 76, connected to sleeve 24 by pin 77, and carries a compression spring 78 between the bracket and the inner end wall 65. The outer end of the shaft is threaded into a nut 80 which holds an outer compression spring 82 against wall 67. The bracket 76 and nut 80 also between them hold the outer ends of the two sleeves with their inner ends trapping a wiper disc 84. The rear edge of this disc is received by the recess of a movable wiper arm 86 of a linear potentiometer 88 attached to the rear wall of the housing 60, which is slotted as indicated at 64a to allow movement of the wiper arm 86. It will be apparent that the compression spring 78 resists compression of the extendible member while spring 82 resists extension, and that two similar extendible members set at right angles to each other have the effect of urging the shaft 18 towards a neutral, generally vertical orientation.

The sleeve 24 is in the nature of a rectangular block having vertical sides pivoted to brackets 76 and having a bore for slidably receiving the shaft 18. The sleeve may be held in different positions on the shaft by set screws, or by nuts if the whole main part of the shaft is threaded. When the sleeve is lowered on the shaft the controller has, in effect, a greater mechanical advantage, i.e. it is moved more easily against the spring force, but needs more movement for full scale deflection. This provides one way for mechanical adjustment of the sensitivity; an electrical adjustment is described below. When the position of the sleeve 24 is adjusted, it will cause the handle to lean in its neutral position; however as mentioned above the bearing block 28 of each extendible member may be made adjustable to compensate for this.

Figure 6:
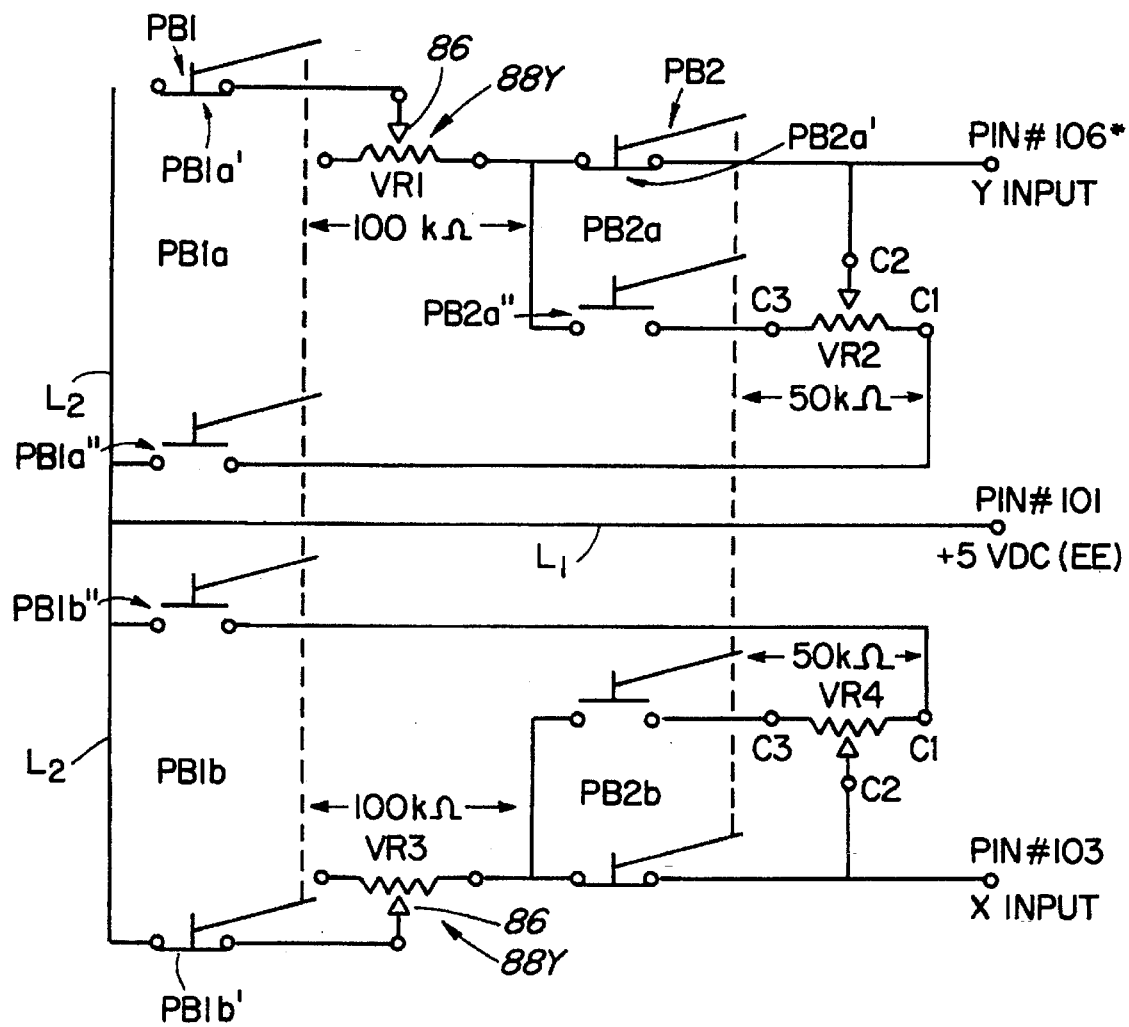
FIG. 6 is a circuit diagram.

The electric circuit shown in FIG. 6 also includes means for calibrating the controller without moving the handle in the conventional way; it also includes means for electrically adjusting the sensitivity. As shown, the circuit has two sections, relating to the X and Y axes inputs received from the potentiometers of the two extendible members, these potentiometers being shown as 88X and 88Y and as having variable resistances VR1 and VR2. Each potentiometer has a maximum resistance of 100K ohms.

As shown, the circuit includes input line L1 leading from pin 101 having an input supply voltage Et, which is usually 5 volts D.C., to line L2, A push button PB1 has two ganged portions PB1a and PB1b, one for each of the circuit sections, each portion having a normally closed switch PB1a', PB1b' which connect lines L2 to one end of the potentiometers 88X and 88Y. Each portion also has a normally open switch PB1a", PB1b", and these connect the line L2 to outer ends 1 of variable resistors VR2, VR4. Further ganged push buttons PB2a and PB2b each have a normally closed switch PB2a', PB2b' connecting the respective potentiometers 88X and 88Y to input pins 103 and 106 respectively, and normally open switches PB2a", PB2b" connecting the potentiometers to inner ends 3 of respective variable resistors VR4, VR2. The variable resistors VR4, VR2, which may be rotary potentiometers, have sliding contacts 2 connected to respective input pins 103, 106.

Considering the Y circuit shown in the top part of the drawing, in normal operation of the controller, the input voltage of +5 volts DC applied at pin 101 passes through lines L1 and L2 and normally closed switch part PB1a' and then to the sliding contact 86 of the potentiometer 88Y, and then into the part of the resistance VR1 of this potentiometer dependent on the position of the wiper arm 86. The current then flows to return pin 106. Accordingly, potentiometer 88Y regulates the current flow in this circuit. At the mid position of the potentiometer, as shown, one half of its resistance VR1 (i.e. 50K ohms) will be in circuit, and the current flow, which will be referred to as "I mid." will be given by $$I\,\text{mid.} = \frac{Et}{VR1/2}$$

A minimum and a maximum current value must also be established to enable the calibration of the joystick. To avoid the need to move the joystick against its strong springs during calibration, the calibration is done by push buttons PB1a, Pb1b, PB2a, and PB2b, with the joystick remaining in the neutral position so that one half of VR1 is in circuit.

The minimum current value for the Y circuit is established when PB2a is activated. This closes PB2a" and opens PB2a'. consequently, resistances comprising one half of VR1 and part of VR2 between contacts C2 and C3 (i.e. VR2(2-3)) are put in series between pin 101 and 106. This current value will be called "I min."

$$\text{Thus,}\,I\,\text{min.} = \frac{Et}{VR1/2 + VR2(2-3)}$$

The maximum current value is established when PB1a is activated. This opens PB1a' and closes PB1a", and puts the resistance portion of VR2 between 1 and 2 (shown as VR2(1-2)) between the pins 101 and 106. The resultant current value will be called I max.

$$\text{Thus,}\,I\,\text{max.} = \frac{Et}{VR2(1-2)}$$

Calibration of the joystick is done by initially adjusting the variable resistors VR2, VR4 to give suitable sensitivity, as will be discussed below. This is followed by providing the computer gaming card with three operational values, I min., I mid., and I max. The procedure is as follows:

| STEP | ACTION |
| --- | --- |
| 1 | set VR2, VR4; |
| 2 | at "center joystick and press button #1 prompt: <br> a) press and release button #1 (trigger); |
| 3 | at "move joystick to upper left hand corner and press button #1" prompt: <br> a) hold down PB1; <br> b) press and release button #1; <br> c) release PB1. |
| 4 | at "move joystick to lower right hand corner and press button #1 prompt": <br> a) hold down PB2; <br> b) press and release button #1; <br> c) release PB2. |

Step 1 exerts control over I min. and I max.
Step 2 sets I mid for game play.
Step 3 sets I max. for game play,
Step 4 sets I min. for game play.

Moving the joystick from its neutral position (I mid.) during play causes VR1 to vary the current between a user established minimum value (I min.) and a user established maximum value (I max.). Allowing the user to alter I min. and I max. (current swing), via VR2, constitutes the responsiveness (sensitivity) of the joystick. A narrow current swing requires less movement of the joystick to achieve a given reaction within a computer game, while a broad current swing requires more movement of the joystick to achieve the same reaction. The following examples show how the setting of the variable resistors VR2 and VR4 alters the sensitivity. The figures for resistances are those given in FIG. 6. The formula used for I min and I max are the same as those given above.

|  | VR2(2–3) | VR2(1–2) | I.min. | I max. |
|---|---|---|---|---|
| 1. Medium response. | 25 Kohms | 25 Kohms | $\frac{Et}{50+25}$ | $\frac{Et}{25}$ |
| 2. Max. response | 1 Kohm | 49 Kohms | $\frac{Et}{50+1}$ | $\frac{Et}{49}$ |
| 3. Min. Response | 49 Kohm | 1 Kohms | $\frac{Et}{50+49}$ | $\frac{ET}{1}$ |

These results show that at the medium response, full scale deflection is achieved when the joystick is moved between positions of the potentiometer VR1 which correspond to between 25K ohms and 75K ohms, i.e. one half of its maximum possible movement. At maximum response, the joystick only needs to be moved a very small distance, from the 49K ohms position to the 51K ohms position, to give full scale deflection. At minimum response, the joystick needs to be moves an amount equivalent to 98K ohms on the potentiometer to give the full scale deflection.

We claim:

1. A hand controller for playing video games comprising:
   a base suitable for resting on a level surface;
   a shaft mounted for universal pivoting movement in said base;
   an electrical circuit having means responsive to the position of said shaft, and
   a handle mounted at the upper end of said shaft, said handle having a main hand grip portion with an upper surface in the form of a convex ridge having front and rear surfaces sloping forwardly and rearwardly from a crest, and with the top of said crest sloping downwards from an upper end of the handle at an angle of between 10° and 50° to said level surface on which the base part rests,
   said handle also having a wrist supporting plate which projects from said rear surface, said supporting plate being positioned for supporting the wrist of a right hand when the palm and fingers of the hand are grasping the main body portion with the thumb near to said upper end.

2. A hand controller according to claim 1 wherein the wrist supporting plate meets the rear surface at a junction which extends substantially parallel to the top of the crest.

3. A hand controller according to claim 1, wherein the handle is mounted to the shaft by means of a bracket having a cylindrically curved portion with an elongated slot, and wherein said shaft passes through the slot and is held in the slot by releasable fastening means allowing adjustment of the position of the shaft in the slot, said adjustment being such as to change the angle of slope of the top of said crest.

4. A hand controller for playing video games comprising:
   a base suitable for resting on a level surface;
   a shaft mounted for universal pivoting movement in said base;
   an electrical circuit having means responsive to the position of said shaft, and
   a handle mounted at the upper end of said shaft, said handle having a main hand grip portion with an outer surface in the form of a convex ridge having front and rear surfaces sloping forwardly and rearwardly from a crest,
   said handle being mounted to the shaft by means of a bracket having a cylindrically curved portion with an elongated slot, and said shaft passing through the slot and being held in the slot by releasable fastening means allowing adjustment of the position of the shaft in the slot, said adjustment being such as to change the angle of slope of said crest.

5. A hand controller according to claim 1, wherein the handle is adjustable relative to the shaft by rotation about an axis which is parallel to the top of said crest.

6. A hand controller according to claim 4, wherein the bracket has ends connected to the handle by means allowing adjustment about an axis parallel to the ends of the bracket.

7. A hand controller according to claim 1, further comprising a rotary member positioned at the front of said hand grip portion for rotation by the thumb of a right hand having its palm and fingers grasping the hand grip portion, the rotary member being connected to rotary position sensing means in said circuit suitable for controlling one feature of the video game when rotated.

8. A hand controller according to claim 4, further comprising a rotary member positioned at the front of said hand grip portion for rotation by the thumb of a right hand having its palm and fingers grasping the hand grip portion, the rotary member being connected to rotary position sensing means in said circuit suitable for controlling one feature of the video game when rotated.

9. A hand controller for playing video games comprising:
   a base suitable for resting on a level surface;
   a shaft mounted for universal pivoting movement in said base;
   an electrical circuit having means responsive to the position of said shaft,
   a handle mounted at the upper end of said shaft, said handle having a main hand grip portion with an upper end and a lower end, and
   a rotary member positioned at the upper end of said hand grip portion so as to be rotatable by the thumb of a right hand having its palm and fingers grasping the hand grip portion, the rotary member being connected to rotary position sensing means in said circuit suitable for controlling one feature of the video game when rotated.

10. A hand controller according to claim 9, wherein the said rotary member is positioned to be rotated by circular movement of said thumb.

11. A hand controller according to claim 9, wherein said rotary member is positioned to be operated by said thumb by a forward and backward motion of said thumb on a protruding periphery of the rotary member.

12. A hand controller according to claim 11, wherein the rotary member is mounted on an axis which bisects the slopes of the front and rear surfaces of the handle.

13. A hand controller for playing video games comprising:
   a base suitable for resting on a level surface;
   a shaft mounted at a lower end thereof for universal pivoting movement in said base;
   an electrical circuit having means responsive to the position of said shaft;

a handle mounted at the upper end of said shaft; and a sleeve mounted on the shaft between the lower end and the handle and connected to said base by extendible members which are orientated at right angles to each other when viewed along the shaft axis, each extendible member having spring means serving to bias the shaft into a central neutral position, and each extendible member including a potentiometer sensitive to compression and extension of said member and connected into said electrical circuit, and further comprising means for adjusting the position of the sleeve on the shaft to vary the sensitivity of the controller.

14. A hand controller according to claim 13, wherein said potentiometers are linear potentiometers.

15. A hand controller according to claim 13, having two only of said extendible members, each member having spring means which act to resist both compression and extension from an unstressed neutral length.

16. A hand controller according to claim 15, wherein said potentiometers are linear potentiometers, and wherein each extendible member includes an elongated body having an outer end pivotally mounted on the base and having first and second spaced apart transverse members each with a bore, a shaft slidable in said bores and having an outer end carrying an end bracket connected to said sleeve, first compression spring means acting between said end bracket and the first transverse member, and second compression spring means acting between an inner end of the shaft and said second transverse member, and wherein said shaft has a connection to one of said linear potentiometers.

17. A hand controller according to claim 13, wherein said potentiometers are connected in circuit with calibration switches arranged to simulate the effect of movement of the potentiometers so that operation of such switches gives a signal equivalent to full scale deflection of the handle in mutually perpendicular directions, without movement of said handle.

18. a hand controller for playing video games comprising:

a base suitable for resting on a level surface;

a shaft mounted at a lower end thereof for universal pivoting movement in said base;

an electrical circuit having potentiometers responsive to the position of said shaft;

a handle mounted at the upper end of said shaft; and spring means serving to bias the shaft into a central neutral position;

wherein said potentiometers are connected in circuit with calibration switches arranged to simulate the effect of movement of the potentiometers so that operation of such switches gives a signal equivalent to full scale deflection of the handle in mutually perpendicular directions, without movement of said handle.

19. a hand controller according to claim 18, wherein said calibration switches are in circuit with variable resistors such that adjustment of said variable resistors alters the sensitivity of the controller.

* * * * *